INVENTOR.
ROY C. WILCOX
BY Morris ... [signature]
ATTORNEY

INVENTOR.
ROY C. WILCOX
BY Morris L. Rabkin
ATTORNEY

Aug. 7, 1962 R. C. WILCOX 3,048,665

MAGNETIC RECORD REPRODUCING APPARATUS

Filed Jan. 2, 1959 3 Sheets-Sheet 3

INVENTOR.
ROY C. WILCOX
BY Morris B. Rabkin
ATTORNEY

United States Patent Office 3,048,665

Patented Aug. 7, 1962

3,048,665

MAGNETIC RECORD REPRODUCING APPARATUS

Roy C. Wilcox, Haddonfield, N.J., assignor to Radio Corporation of America, a corporation of Delaware Filed Jan. 2, 1959, Ser. No. 784,787
6 Claims. (Cl. 179—100.2)

The present invention relates to magnetic record reproducing apparatus, and more particularly to apparatus for controlling the reproduction of signals from a magnetic record, such as a magnetic tape.

Transient variations in the speed of a magnetic tape during reproduction or playback operations usually cause distortion of the reproduced signals. This distortion is particularly disadvantageous when the relative position of different signal components recorded on the tape must be maintained. In television tape recording and reproducing apparatus using magnetic tape having record tracks arranged transversely thereof, transient speed variations during playback may cause time irregularities in synchronizing signal components of the reproduced television signal. This prevents proper functioning of synchronizing circuits in the television receiver.

By careful mechanical design of tape transport systems, it is possible to minimize certain repetitive speed variations of the type which give rise to signal distortions known as flutter and wow. Flutter results from tape speed variations that take place repetitively at a rapid rate. Wow results from slow, repetitive tape speed variations. Servo techniques also have been successfully used to reduce flutter and wow. These involve comparison of standard signals and constant frequency control signals recorded on the tape to provide an error signal which is used to control the average speed of a tape driving element, such as a capstan. Transient tape speed variation on the other hand causes signal distortion of a type known as jitter. A television picture obtained from magnetically recorded television signals subject to distortion due to transient speed variation appears to jitter on the screen. Intermittent mechanical stress on parts of the tape transport mechanism, temperature changes, humidity, tape stretching and tape shrinkage are believed to be some of the causes of jitter. The techniques mentioned above have not been completely successful in eliminating jitter, since they are designed primarily to maintain constant the average speed of the tape.

Accordingly, it is an object of the present invention to provide a magnetic record reproduction system wherein signal distortion due to transient variation in speed of the record medium are substantially eliminated.

It is another object of the present invention to provide a magnetic record reproduction system having improved signal reproduction characteristics.

It is a further object of the present invention to provide magnetic tape apparatus wherein jitter distortion is substantially eliminated.

It is still another object of the present invention to provide simplified means for substantially eliminating tape speed variations in magnetic tape record reproduction apparatus.

Still another object of the present invention is to provide an improved magnetic record reproduction system having electrical signal controlled means for substantially eliminating transient variation in tape speed.

The present invention, briefly described, may be embodied in magnetic tape apparatus including electrical signal responsive means operative to establish a region of tape distortion where a magnetic head and the tape are in contact with each other. This tape distortion may take the shape of an indentation of varying size in the tape caused by changing head to tape pressure. It has been found, in accodance with the invention, that tape distortion is related to the instantaneous speed of tape travel in the region of distortion. This change manifests itself on the signal then being reproduced by the head as a time delay, phase and frequency change. Transient tape speed variations are similarly manifested in the reproduced signal. Since the tape distortion is almost instantaneous, random, transient speed variations which cause jitter will be substantially eliminated.

A further feature of the invention is to provide magnetic tape apparatus for producing a signal delay. Since this signal delay varies with the distortion of the tape and the latter is related to the error signal, there is provided, according to a further feature of the invention, an electrically variable signal delay generally suitable for high frequency signal control applications.

The invention itself, both as to its organization and method of operation, as well as the foregoing and other objects and advantages thereof, will become more readily apparent from a reading of the following description in connection with the accompanying drawings in which.

Figure 1:
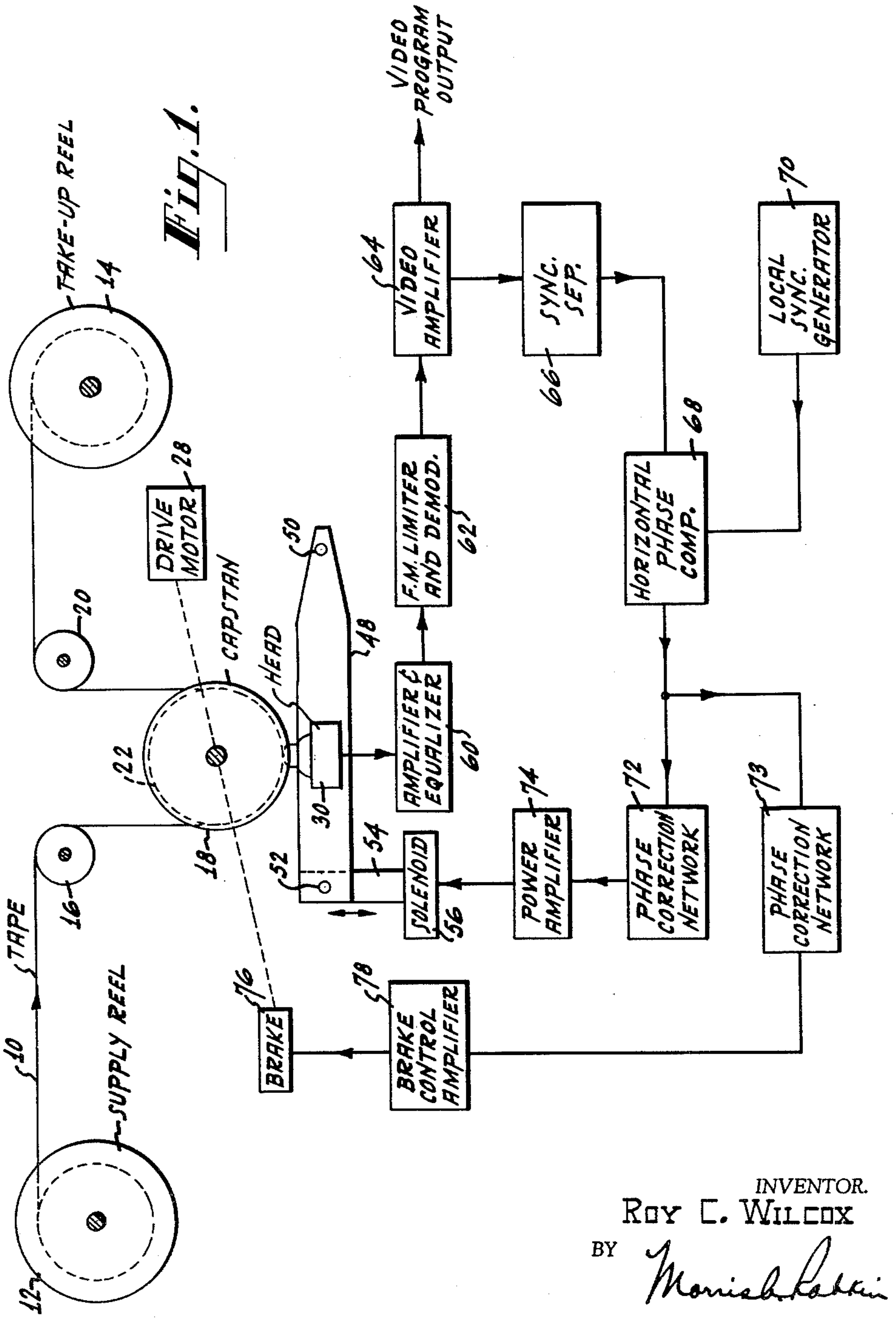
FIG. 1 is a diagrammatic presentation showing an embodiment of the invention wherein a grooved capstan is used for tape drive.

Referring more particularly to FIG. 1, a magnetic tape 10 is shown being transported from a supply reel 12 to a take-up reel 14. The tape passes over an idler roller 16, around capstan 18 and around another idler roller 20 along its path of travel from the supply reel 12 to the take-up reel 14. The capstan 18 is shown in greater detail in FIG. 2 and has a plurality of annular grooves 22, 24 and 26 along its periphery. The capstan may be driven by a drive motor 28 of the synchronous type which is capable of driving the capstan at constant speed.

A magnetic head 30 is located adjacent the capstan 18 on the side of the tape opposite therefrom. The construction of the head 30 is also illustrated in more detail in FIG. 2. The head is shown as being a multi-track head having three core sections 32, 34 and 36 disposed in a plastic positioning medium 38 which maintains the core sections in proper position within a casing 40. Each of the core sections has its own signal translating coil wound thereon. These coils are not shown in the drawing in order to clarify the illustration. Pole portions 42, 44 and 46 project from each of the core sections toward the grooves in the capstan 18 and cooperate with record tracks recorded on the tape 10. A signal gap is located in each of the pole portions 42, 44 and 46 in accordance with conventional magnetic head construction. While three core sections 32, 34 and 36 are shown in the head 30 which cooperate with three annular grooves 22, 24 and 26 in the capstan 18, it will be appreciated that any number of core sections and grooves, including a single core section and groove, may be used in a magnetic tape apparatus constructed in accordance with the invention.

The magnetic head 30 is mounted on a movable member 48. This member is pivotally supported on a pivot 50. The end of the member 48 opposite from the pivotally supported end thereof is attached, as by a pin 52, to the armature 54 of a solenoid 56. Thus, upon energization of the solenoid 56, the member 48 is operative to move the head toward or away from the capstan 18 with a reciprocating motion. Referring once more to FIG. 2, it will be observed that the pole portions 42, 44 and 46 engage the tape 10 at the coated side 58 thereof along a corresponding number of tracks on the tape and maintain the tracks on the tape at the grooves 22, 24 and 26 of the capstan 18. The tape will, accordingly be indented by a predetermined amount in the grooves of the capstan. The capstan has a radius indicated on the drawing (FIG. 2) as $R_0$. The back surface of the tape conforms to this radius when the tape is wrapped around the capstan. The effective radius of curvature of the back surface of the tape around the capstan is designated in FIG. 2 as R. When the member 48 moves to urge the head either toward or away from the capstan, the radius R will vary in accordance with the size of the indentation in the tape. At times, this radius R will be equal to the radius $R_0$ of the capstan. Such indentation causes tape distortion which may be electrically controlled, in the embodiment of the invention illustrated in FIG. 1, to eliminate transient variations in the speed of tape travel as will be explained in greater detail hereinafter.

A servo system for obtaining an error signal to control the degree of distortion of the tape in the head is shown in FIG. 1. This system includes a conventional amplifier and response equalizer 60 which amplifies a video or television signal which may be recorded on the tape 10 in one or several of the record tracks thereon. Such an amplifier and equalizer amplifies the signal and corrects in the usual manner for the frequency response characteristic of the system. The amplified signal from the amplifier and equalizer 60 is applied to a conventional frequency modulation (F.M.) limiter and demodulator 62. The composite television signal, as recorded on the tape in accordance with conventional frequency modulation techniques, may thus be derived. The derived, composite television signal or video program is amplified by a conventional video amplifier 64 and transmitted to suitable utilization circuits which, for example, may include a television transmitter and/or typical studio monitoring circuits.

The composite television signal derived from the amplifier 64 is also applied to a synchronizing signal (sync) separator 66 which may be of the type commonly found in commercial television receivers. Reference may be had to Grob "Basic Television Principles and Servicing," page 362, et seq., for a detailed description of sync separator circuits.

The sync components of the television signal are derived from the sync separator circuit and applied to a horizontal phase comparator circuit 68. This circuit 68 compares the recovered horizontal sync signals from the tape 10 with the horizontal sync signals derived from a standard or local sync generator 70. This local sync generator may be a conventional studio sync generator such as the TG2–A studio sync generator manufactured by Radio Corporation of America, Camden, New Jersey and described in their Instruction Bulletin IB–36155. Alternatively, the sync generator 70 may be provided by a local or distant television signal which is passed through another sync generator similar to the sync separator 66.

The horizontal phase comparator 68 provides an error voltage in response to any phase deviation between the separated sync components and standard sync signals. Phase comparators are well known in the art. Automatic frequency control circuits of many television receivers employ phase comparators extensively. Further reference may be had to volume 21, "Electronic Instruments" section 12—12 of the M.I.T. Radiation Laboratories series for a discussion of suitable phase comparators.

The error signal provided by the phase comparator is a direct current signal which varies in polarity and magnitude as the separated sync components and the standard sync components are either phase advanced or phase delayed relative to each other, or are in phase coincidence with each other. This error signal is applied to a phase correction network 72 which imparts a certain phase lead or advance to compensate for undesirable phase delays in the servo system. Such phase correction networks are used in the illustrated system in accordance with conventional servo techniques. The error signal, after phase correction in the network 72, is applied to a power amplifier 74. This may be a conventional direct current amplifier. The power amplifier 74 is coupled to the solenoid 56, whereby the solenoid is energized in accordance with the error signal to advance or retract the pole portions 42, 44 and 46 of the head 30 into or out of the grooves 22, 24 and 26 in the capstan 18. Such movement of the head provides a distortion of the tape which changes the instantaneous velocity of the tape at the head. This instantaneous change in velocity compensates for any transient speed variations in the tape as might result from tape stretch, shrinkage, and other mechanical or electrical system imperfections. Accordingly, the signal derived by the head 30 changes the phase and frequency of the separated sync components of the reproduced television signal until coincidence thereof with the locally generated sync signals is attained. When the coincidence occurs, the horizontal phase comparator produces a minimum predetermined error signal, which may be of negligible amplitude, indicative of coincidence between the reproduced sync signal and the local sync signals. This minimum, predetermined error signal may cause a nominal tape distortion of one half the total obtainable distortion to permit tape speed variations in either direction to be corrected, as will be explained further hereinafter. When the separated sync signals and the local sync signals are in coincidence, the video program output is the television signal reproduced without distortion due to transient speed variations. The elements 30, 48, 50, 56, 60, 62, 64, 66, 68, 70, 72, and 74 of the system, as so far described, constitute a first servo loop.

Average speed variations may occur in the first servo loop described above and may be eliminated by means of a second servo loop including a brake 76, a brake control amplifier 78, and another phase correction network 73. This brake 76 may be an eddy current brake of conventional type which operates on the motor shaft indicated by the dash line in the drawing to slow the speed of this shaft and thus the speed of the capstan 18. The amount of braking effort is dependent upon a control current applied to the brake 76 by a brake control amplifier 78. This brake control amplifier amplifies the error signal from the horizontal phase comparator 68. Alternative to the use of an eddy current brake illustrated in the drawing, the error signals derived from the phase comparator may be applied to a reactance tube controlled oscillator to directly vary the speed of the drive motor 28, as has become usual practice in television tape recording apparatus. While a television signal having sync components, which provide a control signal when separated from the composite signal, is shown in FIG. 1, the illustrated system is adapted to use a constant frequency control signal recorded on the tape.

While the explanation for the elimination of the transient speed variations is not completely understood at this time, a probable theory of operation is that a distortion pattern caused by frictional force of the head against the tape results in distortion from a stretching and/or compression of the tape at the point of head to tape contact. When the tape passes through this region under distortion, the wavelength of the signal recorded on the tape is instantaneously varied due to compression of the magnetic material or expansion thereof. Such compression or expansion would shift the position of the signal wavelengths recorded on the tape. When the tape has passed the head and the distortion thereof is removed, it again provides a uniform distribution of a recorded signal.

Another probable theory is that the radius R of the tape around the capstan varies instantaneously to vary the speed of the tape. The magnitude of the distortion pattern is related to the size of the indentation in the tape in the region of tape-to-head contact. Similarly, it has been found that the pressure of the head against the tape is also related to the size of the distortion pattern. The size of the distortion pattern may be measured by the effective radius R of the tape as it passes around the capstan.

The size of the distortion pattern also has been found to determine the magnitude of a signal delay. In other words, the video signal reproduced by the magnetic head is delayed in time in accordance with the size of the distortion pattern. Since the signal applied to the solenoid determines the size of the distortion pattern, it follows that the invention provides an electrically controlled means of variable video signal delay. Variable delay up to several microseconds can be obtained with a system in accordance with the embodiment of the invention so far described. Thus, the invention may be utilized in apparatus for obtaining controlled signal delays in video frequencies, as for example, in television transmitters.

Figures 2, 3:
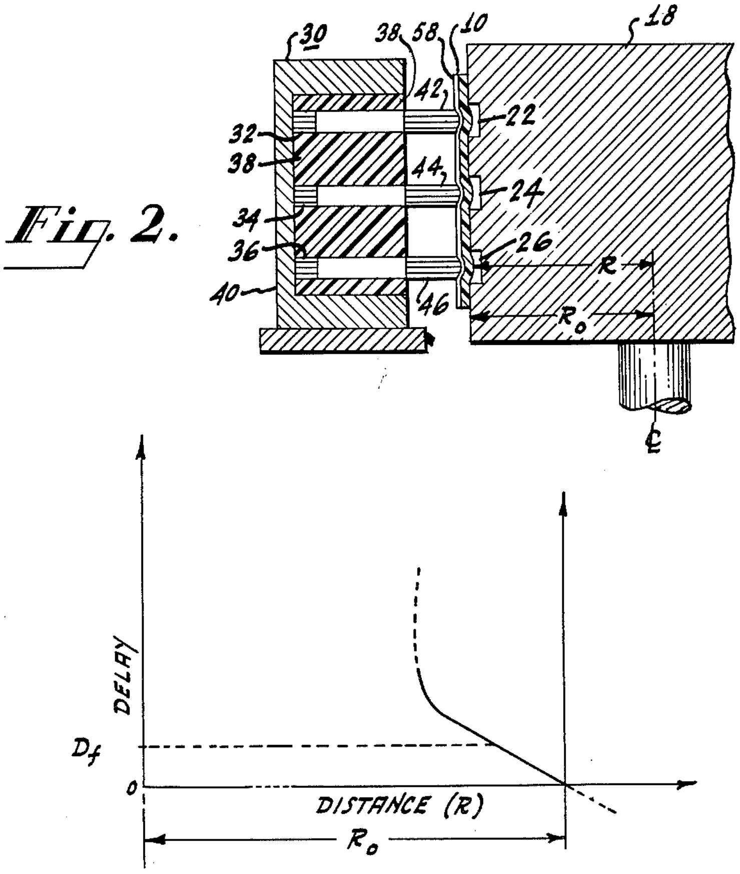
FIG. 2 is a fragmentary sectional view of the grooved capstan shown in FIG. 1 and the magnetic head associated therewith.
FIGS. 3 and 4 show a pair of curves illustrating the operation of the system shown in FIG. 1.

FIG. 3 shows a curve which indicates the amount of delay as varied in accordance with the size of the indentation in the tape measured by the radius R. The scale to which the curve is drawn has been expanded as shown by the interruption along the abscissa. It will be noted that the curve contains a dashed portion above the abscissa in the region where tape rupture might occur. Another dashed portion of the curve which appears below the abscissa indicates where the head and tape are no longer in magnetic or physical contact. The amount of delay in microseconds is variable from a given delay when the radius R of the tape is a mean radius less than the radius $R_0$ of the capstan. Thus, the video signal may be advanced or delayed by changing the dimension R in accordance with signals applied to the solenoid 56.

Figure 4:
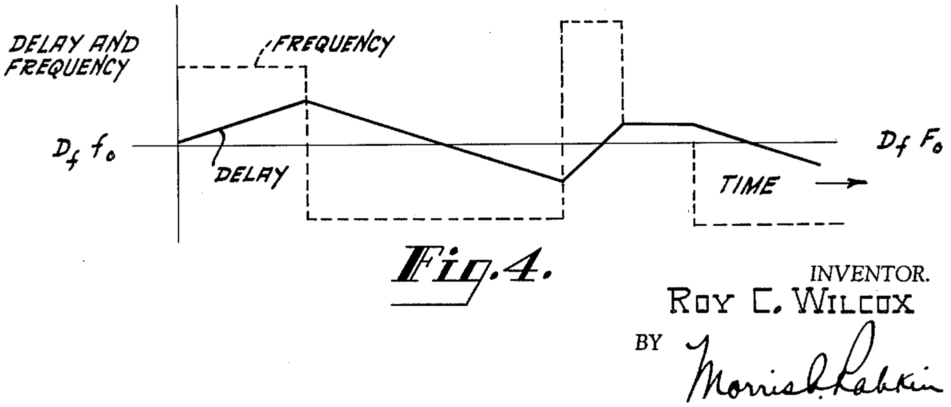

The curve shown in FIG. 4 illustrates the change in frequency of the signal reproduced by the magnetic head which can be controlled electrically in accordance with the invention. When the radius of the tape R corresponds to the mean radius which is less than the radius of the capstan $R_0$, a certain fixed delay D is obtained. This delay may be varied in a linear manner by changing the radius R as shown in the curve of delay indicated by the solid line. The curve in FIG. 4 shown by the dashed line illustrates the change in frequency of a signal of constant frequency $F_0$ which may be recorded on the tape. The frequency of this signal will vary with the differential of the delay. Thus, the frequency will increase instantaneously to a certain value while the signal is being delayed in time. The frequency will decrease while the signal is being advanced in time. The frequency does not change when no delay is imparted thereto. This effect is indicated by the rising and falling portions of the delay curve which indicate a time delay and a time advance, respectively. The flat portion of the delay curve indicates an advance of a signal which has already experienced a minimum delay.

The invention may be embodied in a system for reproducing signals recorded transversely on a magnetic tape, as is the case in the RCA TRT–1AC color video tape recorder which is described in an article by J. R. Grever appearing in Broadcast News magazine, volume 100, April 1958, page 6 et seq. Such a video tape recorder is diagrammatically shown in FIG. 5. The magnetic tape 80 is reeled between a supply reel 82 and a take-up reel 84 along a path established by a pair of idler rollers 86 and 88. A capstan 90 and a cooperating pressure roller 92 engage the tape therebetween for driving the tape between the reels at a constant speed. The capstan is driven by a drive motor 94 of the synchronous type. The magnetic tape has a plurality of record tracks recorded transversely thereon as shown in detail in the above-mentioned article. These tracks are scanned by a plurality of magnetic heads 95 mounted along the periphery of a head wheel 96. Four such heads 95 may be disposed 90° apart along the periphery of the wheel. This arrangement is better shown in FIG. 6. A constant speed motor 98 drives the wheel at constant speed (for example, 240 revolutions per second). Slip rings 100 are mounted on the shaft connecting the head wheel 96 to the motor 98 for extracting the signals derived by the magnetic heads. A tone wheel 102 is also mounted on the motor shaft and generates a tone in the pick-up 124 four times during each revolution of the head wheel 96. This tone wheel is mentioned in the aforementioned Grever article.

The tape is conformed to an arc surrounding the head wheel by a vacuum shoe 104 similar to the vacuum shoe illustrated in the aforesaid article, as it is being reeled in a direction along the axis of the head wheel 96. The vacuum shoe is supported on an L-shaped member 106 which is pivotally supported on a pivot 108. It should be appreciated that the L-shaped member 106 is disposed below the head wheel 96 and away from the motor 98 so as not to interfere with the operation thereof. The vacuum shoe 104 is disposed on a pivot support 105 on the member 106 so as to permit threading of the tape around the head wheel 96. This construction is shown in greater detail in FIG. 6. The vacuum shoe 104 has a cavity 110 through which the periphery of the head wheel sweeps as it scans the tape. A tube 112 is connected to this cavity and to a vacuum source (not shown) for creating a vacuum in the cavity.

The support 106 and the vacuum shoe 104 may be moved by means of a cam 114 and lever 116. The cam may be a circular disc which is eccentrically mounted on a stud 117 on the lever 116. Some spring return means, such as a hairpin spring around the pivot 108 may be used to insure that the member 106 follows the cam. The lever 116 is connected to the cam to rock the cam 114. A motor 118 drives a screw 120 through a gear arrangement in a gear box 122. The screw is universally attached to the end of the lever so as to permit rocking of the cam by the lever as the screw is advanced or withdrawn. The motor may be a reversible, direct current motor so as to permit the screw to be advanced or retracted. Accordingly, the cam will rotate in opposite directions to provide movement of the vacuum shoe 104 toward or away from the head wheel 96.

By means of the movable vacuum shoe 104, the tape may be stretched and distorted around the head wheel 96 so as to provide a time delay which will compensate for transient speed variations in the tape as it is reeled across the head wheel. A servo system is provided which derives an error signal from the signal reproduced by the heads in the head wheel for use in controlling the motor 118 to selectively move the vacuum shoe and variably distort the tape in the region of head wheel to tape contact.

The slip rings 100 are connected to a head switching circuit 126. The signal from the tone wheel pick-up head 124 is also supplied to the head switching circuit. The head switching circuit operates to combine the signals successively reproduced by each of the heads in the head wheel so as to reproduce the television signal recorded on the tape in a continuous manner. The construction and operation of the head switching circuit 126 does not form part of the present invention. Reference may be had to the aforementioned Grever article for a detailed description of the head switching circuit. A video output signal is provided after the demodulation and processing in an FM demodulator and processing circuit 128. The television signal is also applied to a sync separator 130, similar to the sync separator 66 shown in FIG. 1. A local sync generator 132, similar to the local sync generator 70, provides a standard sync signal which is compared in the phase comparator 134 with the signal separated from the reproduced television signal in the sync separator circuit 130 to provide an error signal variable in magnitude and polarity in accordance with the phase variations between the separated sync components and the local sync signal. This error signal is applied to a phase correction network 136. The error signal, after phase correction, is amplified in an amplifier 138 and applied to control the motor 118. This motor 118 may be a standard direct current servo motor.

Average tape speed is controlled by the error signal from the horizontal phase comparator. The error signal may be applied to a speed control system diagrammatically depicted by the block 140. This system may include an eddy current brake and brake amplifier as shown in FIG. 1. The speed control system may then be coupled mechanically to the drive motor 94.

Figure 5:
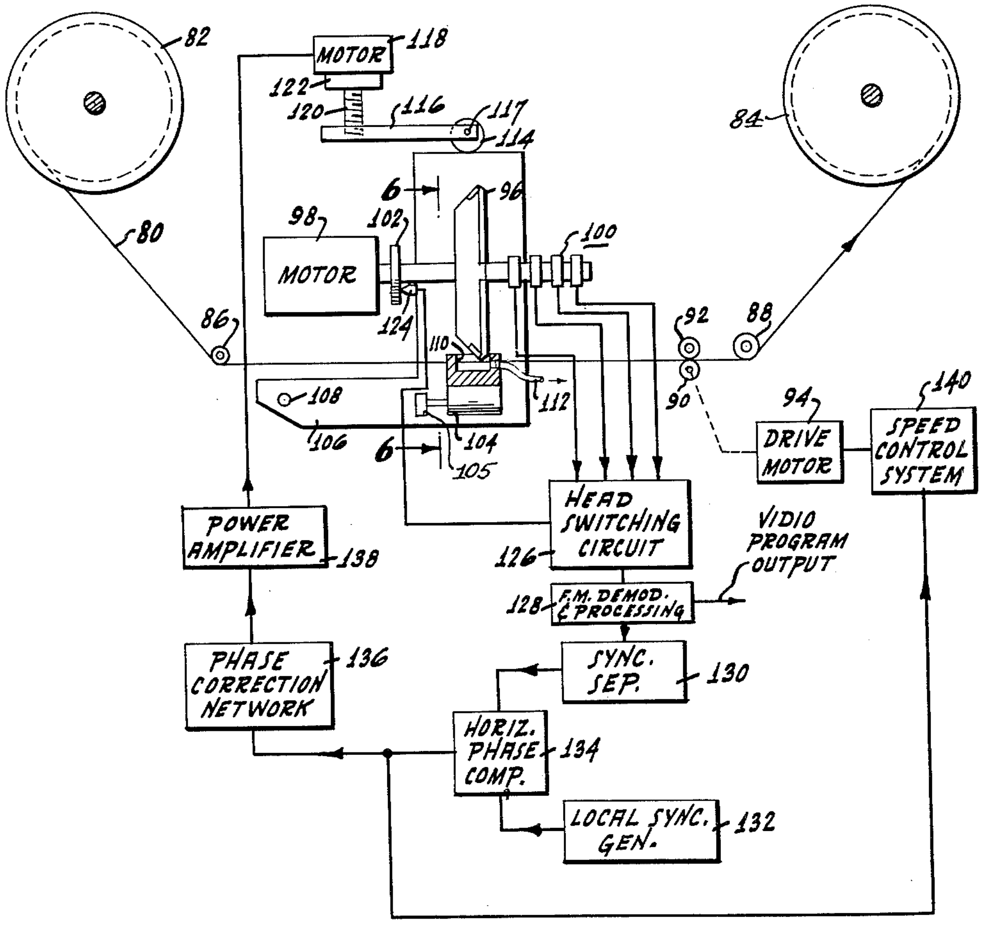
FIG. 5 is a diagrammatic representation of another embodiment of the invention wherein a rotatable head wheel assembly is used for transversely scanning a magnetic tape.
Figure 6:
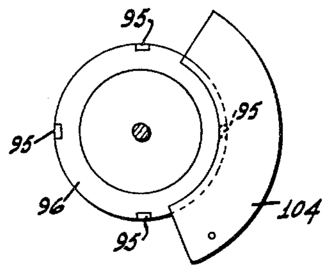
FIG. 6 is an end view of the head wheel assembly shown in FIG. 5.

The mode of operation of the system illustrated in connection with FIG. 5 is similar to that of the system illustrated in FIG. 1. However, it will be noted that the means for supporting the tape against the head, namely, the vacuum shoe, is movable rather than the head itself. The illustrated system is important in transverse scan tape recording equipment, since the magnetic heads are desirably in proper position aligned with the transverse record tracks for scanning the tracks. By selective distortion of the tape in accordance with the invention, the position of the signals recorded on the record tracks may be varied to a degree sufficient to permit proper reproduction of the recorded signals at the correct instants.

From the foregoing description, it will be apparent that I have provided an improved magnetic record reproducing system by means of which greater fidelity of reproduction can be obtained by eliminating distortion due to transient and other variations in the speed of the record. While I have shown systems according to my invention in diagrammatic form, various components useful therein, as well as variations in the disclosed systems themselves coming within the spirit of the invention will, no doubt, readily suggest themselves to those skilled in the art. Hence, I desire that the foregoing be considered merely as illustrative and not in a limiting sense.

What is claimed is:

1. In magnetic tape apparatus, a system for substantially eliminating distortion of reproduced signals on a magnetic tape carried by said apparatus and having a control signal recorded thereon, said distortion being due to speed variations of said tape, said system comprising a capstan having a groove therein, means for reeling said magnetic tape around said capstan with said tape bridging said groove, a magnetic head for scanning said tape to reproduce said control signal, said head being disposed to engage said tape at said groove with varying pressure, means coupled to said head responsive to said reproduced control signal providing an error signal in accordance with variations of said control signal, and means responsive to said error signal for varying the pressure of said head upon said tape.

2. A magnetic record reproduction system for reproducing signals recorded on a magnetic tape together with synchronizing signals of constant frequency comprising a capstan for peripherally engaging and driving a magnetic tape having said signals recorded thereon, said capstan having an annular peripheral groove, a magnetic head for reproducing said tape recorded signals having pole portions adapted to engage said tape, a movable head support mounting said head with said pole portions projecting into said capstan groove, a source of local synchronizing signals of said constant frequency, means responsive to said tape recorded signals and to said local synchronizing signals for providing an error signal varying in polarity and magnitude in accordance with phase differences therebetween, and electromechanical means for reciprocating said head support for moving said pole portions into and out of said groove to provide indentations in said tape of varying size responsive to said error signal.

3. The invention as set forth in claim 2 including a motor for driving said capstan, and means for controlling the average speed of said motor responsive to said error signal.

4. In magnetic tape apparatus for reproducing a television signal having sync portions recorded on magnetic tape handled in said apparatus, a system for substantially eliminating signal distortion due to variations in tape speed comprising a magnetic head for reproducing said television signal, means for reeling said tape across said head including a capstan having an annular peripheral groove therein, said capstan and said head being disposed adjacent to each other on opposite sides of said tape with said head projecting into said groove, said head and capstan being variably shiftable with respect to each other, means responsive to said television signal for separating said sync portions therefrom, means responsive to said separated sync portions to derive an error signal in accordance with phase variations therein, and means responsive to said error signal for variably shifting said head and capstan with respect to each other to distort said tape in said groove.

5. The invention as set forth in claim 4 wherein said last named means includes a support mounting said head, a solenoid having an armature secured to said support, and means for applying said error signal to said solenoid.

6. A system for reproducing a control signal recorded on a recording medium comprising a capstan having a groove therein, means for reeling said medium around said capstan with said medium bridging said groove, reproducing means for scanning said medium to reproduce said control signal, said reproducing means being disposed to engage said medium at said groove with varying pressure, means coupled to said reproducing means responsive to said reproduced control signal providing an output signal in accordance with variations of said control signal, and means responsive to said output signal for varying the pressure of said reproducing means upon said medium.

References Cited in the file of this patent

UNITED STATES PATENTS

| | | |
|---|---|---|
| 1,909,504 | Robbins | May 16, 1933 |
| 2,648,589 | Hickman | Aug. 11, 1953 |
| 2,797,402 | Duffey et al. | June 25, 1957 |
| 2,809,238 | Fay | Oct. 8, 1957 |
| 2,864,621 | Stavrakis | Dec. 16, 1958 |
| 2,942,061 | Pfost et al. | June 21, 1960 |

FOREIGN PATENTS

| | | |
|---|---|---|
| 676,652 | Great Britain | July 30, 1952 |
| 899,195 | France | Oct. 27, 1943 |